Dec. 2, 1969   SHINICHI IKARI   3,481,785
LEAD STORAGE BATTERY CONTAINING A SULFONIC ACID SUBSTITUTED
NAPHTHALENE/FORMALDEHYDE CONDENSATION PRODUCT
Filed March 28, 1966   3 Sheets-Sheet 1

*INVENTOR*
SHINICHI IKARI

BY *Wendroth, Lind & Ponack*

ATTORNEYS

INVENTOR
SHINICHI IKARI

BY Wenderoth, Lind & Ponack
ATTORNEYS

United States Patent Office 3,481,785
Patented Dec. 2, 1969

3,481,785
LEAD STORAGE BATTERY CONTAINING A SUL-
FONIC ACID SUBSTITUTED NAPHTHALENE/
FORMALDEHYDE CONDENSATION PRODUCT
Shinichi Ikari, 3-4 Saigo-doro, Moriguchi-shi,
Osaka-fu, Japan
Filed Mar. 28, 1966, Ser. No. 537,765
Int. Cl. H01m 35/02, 39/04; C08g 37/36
U.S. Cl. 136—26    8 Claims

ABSTRACT OF THE DISCLOSURE

Lead storage batteries having a sulfonic acid substituted naphthalene/formaldehyde condensation product either in their negative plate paste or in their electrolyte have improved charge acceptability and increased life.

Figure 1:
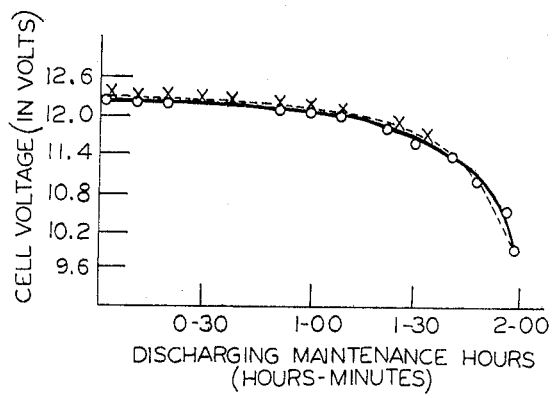

This invention relates generally to a lead storage battery wherein a naphthalene sulphonic acid derivative is present in a paste of a negative plate, or wherein said derivative is present in an electrolyte.

In the past, dilute sulphuric acid has been used as a liquid electrolyte bar lead storage batteries, and several substances have been suggested for additives. There are two purposes in using additives: One is to prevent the sulphation of the plates, in particular of a negative plate, and to prolong the battery life; the other is to promote an oxidation reaction or a reductive reaction which is induced when a storage battery is charged or discharged, and thereby to increase its capacity. No prior additives have achieved either of these purposes. Thus dilute sulphuric acid is still used alone as an electrolyte in lead storage batteries.

In charging a fixed lead storage battery, it is usual that a floating charge of 2.15 volts be made and a constant voltage charge of about 2.4 volts per single cell be periodically made; a constant voltage charge of about 2.4 volts is also made in charging even an automobile lead storage battery.

When charging in this way, the battery voltage is the sum of a resistance overvoltage, an activation overvoltage due to oxidation and reduction, and a concentration overvoltage of sulphuric acid-ion ($SO_4^{--}$) or lead-ion ($Pb^{++}$). Thus, if the sum of these overvoltages is comparatively small, it is possible that a comparatively large amount of electric current will flow in the battery, and so can be used as a charging current for a battery.

However, in a lead storage battery using a conventional electrolyte these over-voltages have a comparatively large value; and when the battery is charged at a constant voltage, an enormous amount of gassing takes place, and the charging current drops rapidly. Therefore, it takes a long time before charging is complete, and the rate of a total amount of discharging current to a total amount of charging is low, that is, the efficiency of the battery is low. In particular, in the case of an automobile lead storage battery, when the speed of an automobile is slow, or when the ratio of its running time to its staying time is large, as will often happen in winter or in a crowded street, the load of the lead storage battery will exceed the amount of its charged current. As a result, the lead storage battery will be under an overdischarged condition, and so an accident may happen which makes it impossible to start the automobile. Even in the case in which such an accident does not happen, it is scarcely possible to charge a battery completely for a long time, and a consequential sulphation may occur.

Thus, the life of the lead storage battery may be greatly reduced.

Therefore, what is required for a conventional lead storage battery is a special characteristic of supplying a greater quantity of charging current into the lead storage battery in a short period of time.

Of course, it is difficult to think that the above-mentioned defects are defects of the conventional electrolyte itself. An electrolyte free from such defects, however, is quite desirable.

Lead dust, litharge, etc., are used in making a paste of a negative plate of a lead storage battery; and for an additive to said paste, expanding or contracting agents such as barium sulphate, lignin allied substances, etc., and electric conductive substances, such as carbon powder have been suggested. Such additives have proved to have no effect of said charging characteristics. In order to improve the charging characteristics of a conventional lead storage battery, a new additive is needed which has a special characteristic besides those possessed by conventional additives.

It is the most important object of this invention to provide a lead storage battery which is free from said defects and which has a much larger rechargeable characteristic than that of conventional batteries. More particularly, another important object of the present invention is to provide a lead storage battery consisting of a usual lead negative plate, a lead dioxide positive plate and a separator wherein any of the following products is incorporated in a dilute sulphuric acid of the normal concentration, or wherein any of said following products and an additive, for example, barium sulphate or a lignin allied substance, are present in a negative plate: a naphthalene sulphonic acid derivative as, for example, a sodium salt of an alkyl naphthalene sulphonic acid formaldehyde condensation product

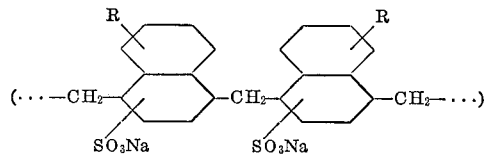

or a sodium salt of naphthalene sulphonic acid formaldehyde condensation product

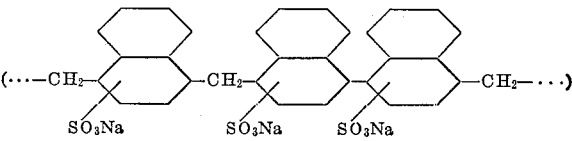

or a formaldehyde condensation product between alkyl naphthalene and an aromatic sulphonic acid, as, for example, anthracene α-methyl naphthalene sulphonic acid formaldehyde condensation product, and a mixture of other aromatic sulphonic acid condensation products.

In accordance with this invention, a naphthalene sulphonic acid derivative added to a dilute sulphuric acid electrolyte or a naphthalene sulphonic acid derivative which is present in a negative paste acts particularly on the negative plate during charging, and has an effect of preventing hydrogen gas from evolving before the current reaches a high current density. In other words, said derivative promotes the reductive reaction of the negative plate.

Therefore, said derivative is able to charge a storage battery with a high current density at a constant voltage, to shorten the time required for charging it, to improve its charging efficiency and to prevent the sulphation of said battery. What is more, the lead storage battery of this invention has such characteristics that the power consumed is very small for the use of a floating voltage under perfect charging conditions, the discharging capacity is improved at room temperature or at lower temperatures, and its life is prolonged.

What is more, since a naphthalene sulphonic acid derivative for example, a naphthalene sulphonic acid formaldehyde condensation product, may be present in paste of a negative plate with an additive, for example, barium sulphate and a lignin allied substance, the lead storage battery of this invention has the good characteristics of the naphthalene sulphonic acid formaldehyde condensation product besides the special characteristics of barium sulphate and a lignin allied substance. The detailed function of said naphthalene sulphonic acid formaldehyde condensation product and of said additive is not clear. It is not known whether the former will make a mobile diffusion of $SO_4^{--}$ ion easier, or the latter will act catalytically on a lead-ion reaction mechanism in charging and discharging reactions

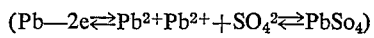

$$(Pb-2e \rightleftarrows Pb^{2+} + Pb^{2+} + SO_4^{2-} \rightleftarrows PbSo_4)$$

In short, the lead storage battery has advantages other than the effect of the conventional additive, promotes oxidation and reductive reactions which occur during charging or discharging, has an enlarged capacity and has a prolonged life.

A lead storage battery having a negative plate using any of the additives of this invention has an effect of preventing hydrogen gas from evolving until the current reaches a high current density during charging. Especially, said battery is charged at a very high current density during charging at constant voltage. Thus, said battery has remarkable effects of reducing the time required for charging it, increasing its charging efficiency, preventing sulphation, and prolonging its life.

Any naphthalene sulphonic acid derivative used in this invention is very stable in a solution of sulphuric acid, and so there is no danger of liberating any substance deleterious to the lead storage battery because said derivative is treated at high temperatures for a long time in a concentrated solution of sulphonic acid during its manufacture.

The following examples illustrate specific embodiments of this invention and compare special characteristics of the lead storage battery of this invention with those of a conventional lead storage battery. The former uses a dilute sulphuric acid to which a naphthalene sulphonic acid derivative is added; the latter uses only a dilute sulphonic acid of the same concentration.

Figure 2:
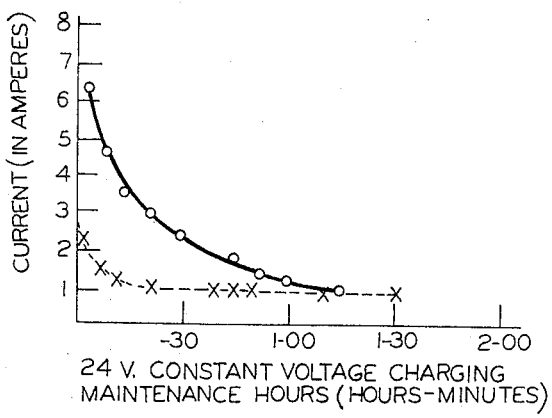
Figure 3:
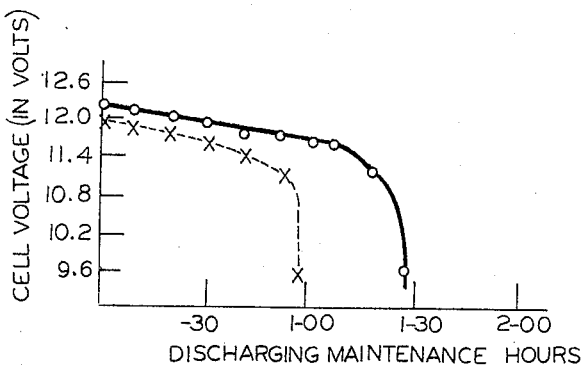
Figure 4:
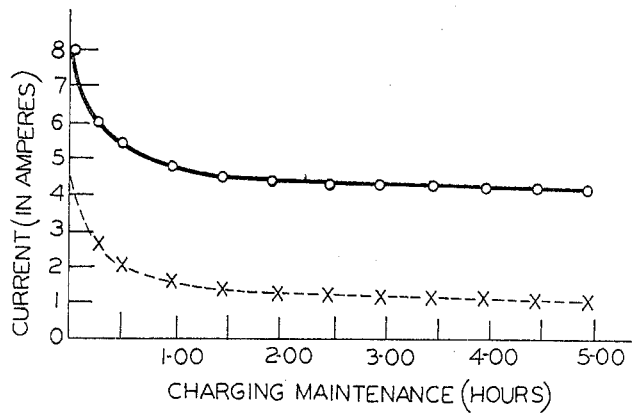
Figure 5:
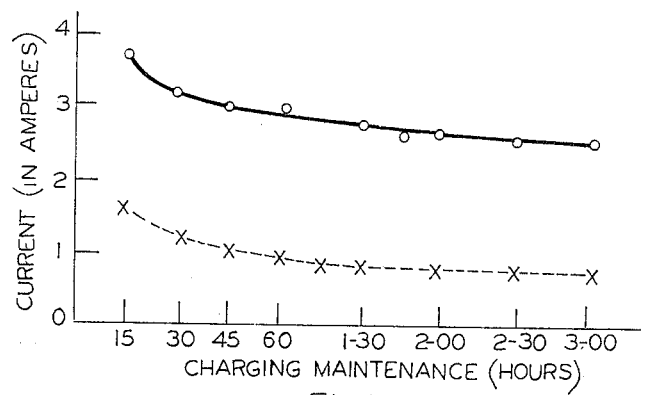
Figure 6:
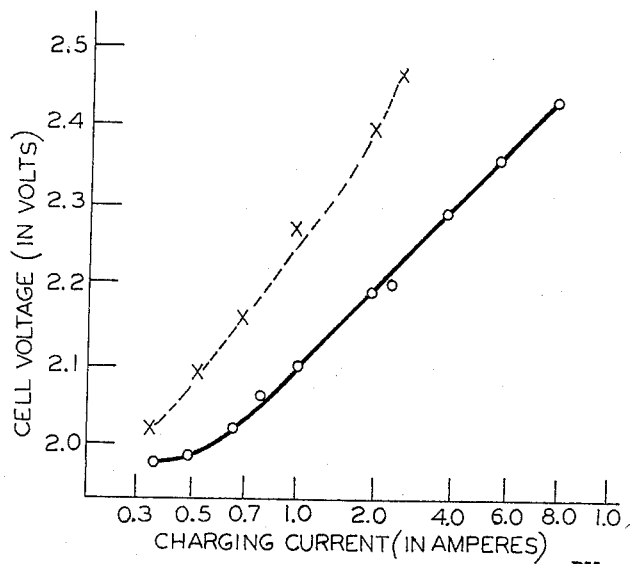
Figure 7:
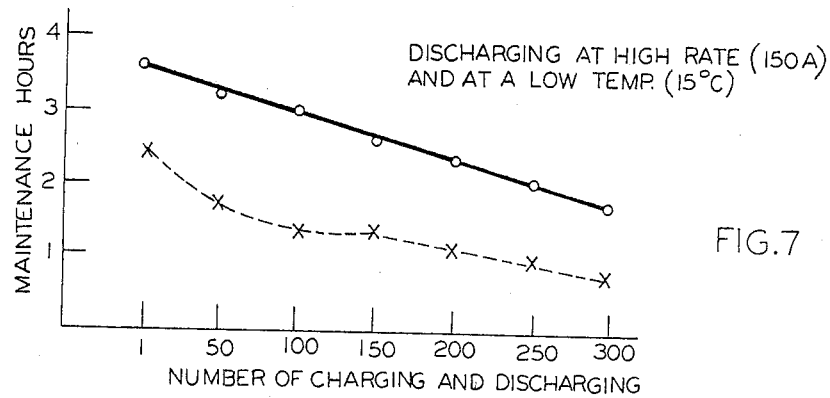
Figure 8:
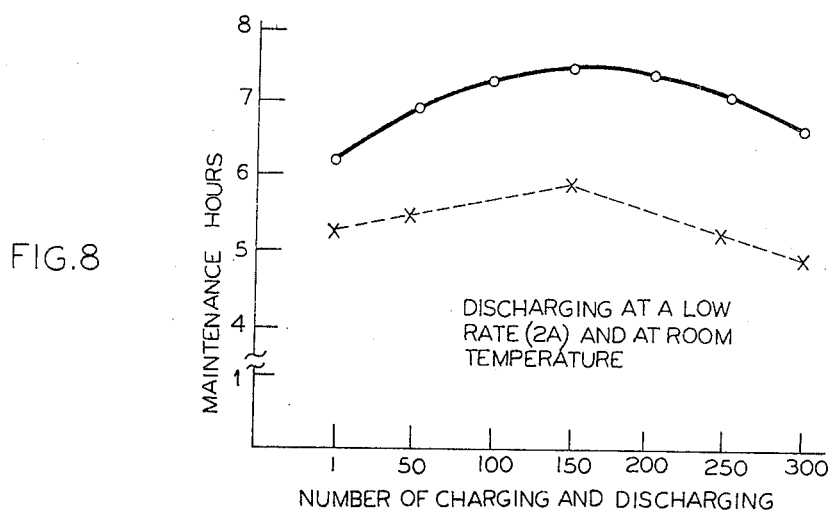
Figure 9:
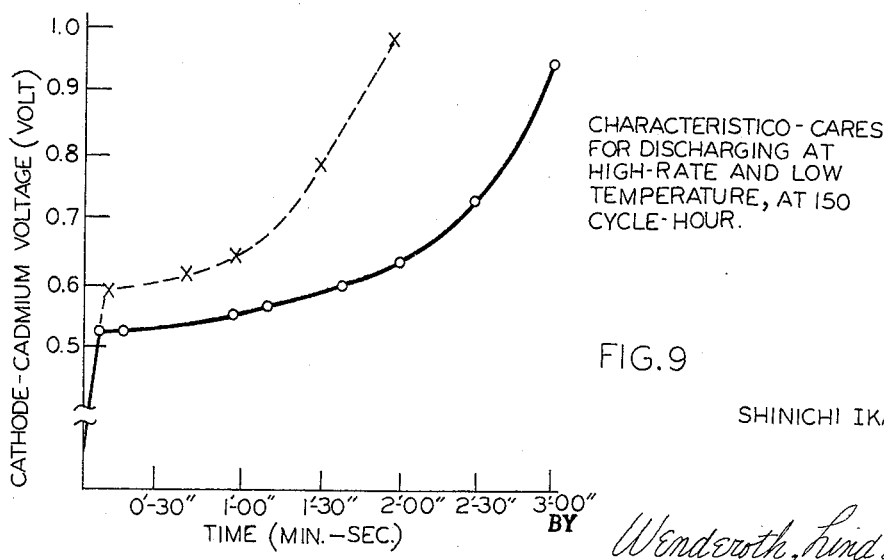

In the drawing:

FIGURE 1 represents discharging characteristic curves showing the relationship between time and voltage at the initial charge of the lead storage battery of this invention and of a conventional commercial lead storage battery of a similar type; and FIGURE 2 represents characteristic curves of a constant voltage charging current showing the relationship between time and voltage when charging is made at a constant voltage of 2.4 volts per cell after the initial charge as shown by FIGURE 1; and FIGURE 3 represents discharging characteristic curves showing the relationship between time and voltage when a discharging current of 2.0 amperes is applied; and FIGURE 4 and FIGURE 5 represent characteristic curves of a constant voltage charging current showing the relationship between time and voltage when charging is made at a constant voltage of 2.4 volts per cell under the conditions of the different amounts of discharging current; and FIGURE 6 represents curves showing the relationship between the charging current and the battery voltage of the lead storage batteries under perfect discharging conditions; and FIGURE 7 represents life characteristic curves of the lead storage battery of this invention and of a conventional commercial lead storage battery of a similar type when they are discharged at a low temperature and at a high rate; and FIGURE 8 represents life characteristic curves of the lead storage battery of this invention and of a conventional one when they are discharged at room temperature and at a low rate; and FIGURE 9 represents life characteristic curves of a low temperature and a high rate discharging with respect to a single-cell negative plate when tested after 150 cycles of charging and discharging.

In the drawing, a continuous line shows a characteristic curve of the lead storage battery of this invention, and a dotted line shows a characteristic curve of a conventional commercial lead storage battery.

EXAMPLE 1

A lead storage battery used for comparison is a dry charged battery of 12-volt and 6-a.h. capacity, and is the one which is used for a small-sized instant two- or three-wheel vehicle; and regarding its liquid electrolyte, a dilute sulphuric acid having a specific gravity of 1.280 (20° C.) is used. An electrolyte used at their tests for the lead storage battery of this invention is made by the following methods: to a dilute sulphuric acid is added 0.05% of a sodium salt of a mixed condensation product obtained from a known condensation reaction among a propylnaphthalene sulphonic acid, a butyl naphthalene sulphonic acid, sulphuric acid and formaldehyde. The lead storage battery used in these tests is the so-called "instant" lead storage battery requiring no initial charge. The first discharging test (25° C., 2.0 a. rate) for the lead storage battery of this test is carried out without charging. The test results show that there is no difference between the lead storage battery of this invention and the conventional lead storage battery, as may be seen from the continuous line and the dotted line in FIGURE 1.

Next, each of these batteries is charged at a constant voltage of 2.4 volts per cell to find out the change in electric current with elapse of time. As FIGURE 2 shows, about 2.9 a.h. is accumulated in the lead storage battery of this invention for about 70 minutes, while about 1.9 a.h. is accumulated in the conventional lead storage battery for about 86 minutes. Then, immediately after that, discharging tests (25° C., 2.0 a. potential) are made. As FIGURE 3 shows, the lead storage battery of this invention has a capacity of about 2.9 a.h.; while the conventional lead storage battery has a capacity of about 1.8 a.h.

The above example shows clearly that the lead storage battery of this invention is capable of storing a considerable quantity of electrical energy in a short time when a constant voltage charging is made.

In winter or in a crowded street, the charging efficiency of an automobile lead storage battery is apt to fall when the standing time of the automobile is comparatively longer than its running time, or when its speed goes down. In such a case, it is clear that a lead storage battery having the above-mentioned characteristics can be advantageously used for automobiles.

FIGURE 4 and FIGURE 5 represent current characteristic curves of charging current by a constant voltage charging for 5 and 3 minutes, respectively, under 60% and 20% discharging conditions, respectively, of the battery capacity.

FIGURE 6 represents the voltage of single-cell by a constant current charging.

Detailed tendencies of these curves do not necessarily agree with one another under different discharging conditions. But one thing is quite clear; the effect of the lead storage battery of this invention is quite different from that of the conventional lead storage battery. That is, from the curve showing the relationship between current and voltage in FIGURE 6, one can see a big difference in the amount of current flow between these two kinds of batteries. For example, by a constant voltage charging of 2.4 volts, the current flow in the battery of this invention is 7.0 a., while the current flow in the conventional batteries is 2.0 a.

What is more, the curve in FIGURE 6 makes us entertain apprehension that the lead storage battery may require an enormous amount of current even under completely charged conditions. But the lead storage battery of this invention consumes only a small amount of current under perfect charging conditions.

Table 1 shows the necessary current value by a constant voltage charging of 2.3 volts–2.5 volts after the lead storage battery is charged with 200% of its discharged current.

TABLE 1

| | Strength of Current (in Milliamperes) | |
|---|---|---|
| | Lead Storage Battery of This Invention | Conventional Lead Storage Battery |
| Constant Voltage Value (in Volts): | | |
| 2.3 | 10.5 | 16.0 |
| 2.4 | 18.0 | 33.0 |
| 2.5 | 47.0 | 65.5 |

Table 1 clearly shows that in using the lead storage battery under floating voltage conditions, its power consumption can be reduced to about 50 to 70% of that of the conventional lead storage battery. The results of life tests made in accordance with the Japan Industrial Standard Testing Methods show that the lead storage battery of this invention has its life about 20% longer than that of the conventional lead storage battery.

EXAMPLE 2

We manufacture a lead storage battery having a negative plate to which a naphthalene sulphonic acid derivative substance is added in accordance with this invention, and also a lead storage battery having a negative plate made in accordance with the conventional method, and compare their capacities. Table 2 shows recipes for additives for the negative plates.

TABLE 2

[Percent in weight calculated on the weight of lead dust]

| | Sulphuric Acid Barium (percent) | Lignin Allied Substance (percent) | Naphthalene Sulphonic Acid Derivative Substance (percent) |
|---|---|---|---|
| Lead Storage Battery of This Invention | 0.5 | 0.5 | 0.05 |
| Commercial Lead Storage Battery | 0.5 | 0.5 | |

The negative plates used in these tests are made as follows: Each hard lead grid whose size is 1.7 mm. in thickness, 120 mm. in height and 140 mm. in width is filled with a paste which is made by kneading a mixed powder of a lead oxide powder and an additive with a dilute sulphuric acid, and said paste is dried and synthesized.

The method of manufacturing the plate of this invention is not different from the conventional manufacturing method. Even if there is a slight difference between the two methods, the effect produced by adding a naphthalene sulphonic acid derivative substance of this invention will not be reduced at all.

What is more, sulphonic acid barium and lignin allied substance are commercial products as a material for a lead storage battery. And a slight difference in the quality of these substances has no significant meaning for the purpose of this invention. Therefore, a detailed description of the properties of these substances is not given here.

A single-cell lead storage battery is assembled from 4 negative plates made from a combination given in Table 2 and from a similar type of three positive plates of commercial products. A dilute sulphonic acid with a density of 1.260 is used as an electrolyte. The initial charge is made for 60 hours with a current flow of 1 a. In a thermostatic bath at 40° C. charging and discharging are repeated, discharging at 20 a.h. and charging at 30 a.h. During this period tests are made on discharging 150 a. at 15° C. (a negative cadmium voltage at the end of charging: 1 volt) and on discharging 2 a. at room temperature (a terminal voltage at the end of discharging: 1.8 volts). The changes in capacities are represented in FIGURES 7 and 8. With respect to the characteristics of a constant voltage charging, there makes no great difference between those of the first example and those of the second example, and so their description is not given here.

FIGURE 7 represents discharging maintenance hours in discharging tests at a high rate and at a low temperature for each definite cycle when charging and discharging tests are made. FIGURE 7 clearly shows that the life characteristic of the lead storage battery of this invention is excellent.

Concerning a low-rate discharging at room temperature shown by FIGURE 8, there is a tendency that the difference between the maintenance hours of the lead storage battery and those of the conventional one becomes greater with the development of their charging and discharging. As the low temperature charging characteristic and the room temperature charging characteristic in FIGURE 7 and FIGURE 8, respectively, clearly show, the lead storage battery of this invention has a longer life and a greater capacity than the conventional lead storage battery does.

FIGURE 9 represents low temperature high rate discharging characteristic curves of the negative plate when 150 cycles of charging and discharging are made. It is clear that the negative plate of the lead storage battery of this invention has excellent voltage characteristics as compared with those of a conventional lead storage battery.

The charging characteristics of Example 1 clearly show that when the lead storage battery of this invention is used as an automobile battery or a floating battery which principally adapts a constant voltage charging method, the lead storage battery of this invention has a marked advantage over the conventional lead storage battery.

As the above examples show, it is clear that the lead storage battery, with an additive present in a paste of its negative plate, has not only excellent charging characteristics but also a much improved capacity and life.

In the above example, the amount of a naphthalene sulphonic acid derivative added is 0.05% of that of lead dust. Even if more than 0.1% is added, there is no difference in its effect for the purpose of this invention. Nay, there is even an unfavorable effect of an abnormal expansion of an active material against the negative plate. On the other hand, when less than 0.001% is added, there is no favorable effect at all.

Concerning the naphthalene sulphonic derivative used in this invention, any substance having a different construction from the constructions of other allied substances may not necessarily produce the same effect, but each substance has a marked effect for the purpose of this invention. A suitable concentration of a naphthalene sulphonic acid derivative used in this invention is less than 0.2% of an electrolyte of the lead storage, and a difference in its quantity is not sensitive to its effect.

If said substance having 0.2% concentration or more is used, it will have a deleterious effect on an active material of the lead storage battery. If its concentration is less than 0.0005%, however, it will have no effect at all for the purpose of this invention.

A naphthalene sulphonic acid derivative substance can be added to an electrolyte of a lead storage battery independently of charging and discharging conditions of the lead storage battery. What is more, any of the following methods can be used in adding said substance to the electrolyte: said substance may be directly added to the electrolyte or said substance may be previously immersed in, or added to, a separator or a plate. Any method will produce practically the same effect.

As has been stated before, the lead storage battery has a much higher charging efficiency and a longer life than either the conventional lead storage battery or a battery using only one liquid electrolyte of a dilute sulphuric acid. What is more, when used as a starting battery, the lead storage battery of this invention can be expected to be made as small as possible in size; and when used as a floating battery, it can save a lot of its electric power consumption. Furthermore, the lead storage battery of this invention can be easily used and requires no such complicated and careful operations as when a conventional additive of an electrolyte is used. Therefore, the lead storage battery of this invention has an excellent industrial utility.

The claimed invention:

1. A lead storage battery containing in a negative plate thereof a member selected from the group consisting of (a) sodium salt of alkyl naphthalene sulphonic acid/formaldehyde condensate, (b) sodium salt of naphthalene sulphonic acid/formaldehyde condensate and (c) alkyl naphthalene/aromatic sulfonic acid/formaldehyde condensate.

2. A battery according to claim 1 wherein the member is sodium salt of alkyl naphthalene sulfonic acid/formaldehyde condensate.

3. A battery according to claim 1 wherein the member is sodium salt of naphthalene sulfonic acid/formaldehyde condensate.

4. A battery according to claim 1 wherein the member is alkyl naphthalene/aromatic sulfonic acid/formaldehyde condensate.

5. A battery according to claim 4 wherein the condensate is anthracene/α-methyl naphthalene sulfonic acid/formaldehyde condensate.

6. A lead storage battery according to claim 1 containing the member in its electrolyte.

7. A lead storage battery according to claim 1 having a negative plate comprising paste containing between 0.001 and 0.1 percent by weight of the member and an additive.

8. A lead storage battery according to claim 6 wherein said member comprises from 0.0005 to 0.2 percent by weight of the electrolyte.

References Cited

UNITED STATES PATENTS

| | | | |
|---|---|---|---|
| 3,073,884 | 1/1963 | Pinkerton | 136—100 |
| 2,759,037 | 8/1956 | Greenburg et al. | 136—26 |
| 2,837,589 | 6/1958 | Konig | 136—26 |

OTHER REFERENCES

E. J. Ritchie: The Electrochemical Society, Preprint 92-34, 1947, pp. 417-418.

WINSTON A. DOUGLAS, Primary Examiner

A. SKAPARS, Assistant Examiner

U.S. Cl. X.R.

136—154